US006237404B1

United States Patent
Crary et al.

(10) Patent No.: US 6,237,404 B1
(45) Date of Patent: *May 29, 2001

(54) APPARATUS AND METHOD FOR DETERMINING A DRILLING MODE TO OPTIMIZE FORMATION EVALUATION MEASUREMENTS

(75) Inventors: Steven F. Crary, Sugar Land; Ralf Heidler, Stafford; Cengiz Esmersoy; Martin E. Poitzsch, both of Sugar Land, all of TX (US)

(73) Assignee: Schlumberger Technology Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,926

(22) Filed: Feb. 27, 1998

(51) Int. Cl.$^7$ ............................ G06F 19/00; E21B 45/00; E21B 47/00; G01V 1/40
(52) U.S. Cl. .................. 73/152.03; 73/152.46; 73/152.54; 175/50; 175/40
(58) Field of Search .............. 73/152.01, 152.04, 73/152.03, 152.14, 152.05, 12.16, 152.44, 152.46, 152.54; 175/48, 50, 40

(56) References Cited

U.S. PATENT DOCUMENTS

| | | | |
|---|---|---|---|
| 2,677,790 | * 5/1954 | Arps | 324/1 |
| 2,973,471 | * 2/1961 | Armistead et al. | 324/0.5 |
| 3,115,774 | * 12/1963 | Kolb | 73/151 |
| 3,237,093 | * 2/1966 | Bennett et al. | 324/1 |
| 3,865,201 | 2/1975 | Haden | 175/50 |
| 4,223,399 | * 9/1980 | Hackett | 367/41 |
| 4,474,250 | * 10/1984 | Dardick | 175/1 |
| 4,549,431 | * 10/1985 | Soeiinah | 73/151 |
| 4,763,258 | * 8/1988 | Engelder | 364/422 |
| 5,017,778 | 5/1991 | Wraight | 250/254 |
| 5,130,950 | 7/1992 | Orban et al. | 367/34 |
| 5,148,407 | 9/1992 | Haldorsen et al. | 367/32 |
| 5,241,273 | 8/1993 | Luling | 324/338 |
| 5,349,337 | * 9/1994 | McCormick | 340/680 |
| 5,448,227 | 9/1995 | Orban et al. | 340/854.4 |
| 5,467,832 | 11/1995 | Orban et al. | 175/45 |
| 5,581,024 | * 12/1996 | Meyer, Jr. et al. | 73/152.03 |
| 5,585,556 | 12/1996 | Petersen et al. | 73/152.03 |
| 5,705,927 | 1/1998 | Sezginer et al. | 324/303 |
| 5,774,420 | 6/1998 | Heysse et al. | 367/83 |
| 5,842,149 | 11/1998 | Harrell et al. | 702/9 |
| 6,021,377 | 2/2000 | Dusinsky et al. | 702/9 |

* cited by examiner

*Primary Examiner*—Hezron Williams
*Assistant Examiner*—David J. Wiggins
(74) *Attorney, Agent, or Firm*—John J. Ryberg; Brigitte L. Jeffery

(57) ABSTRACT

There are many natural pauses during rotary drilling operations where a portion of the drill string remains stationary. Pauses include drill pipe connections, circulating time, and fishing operations. These pauses are used to obtain formation evaluation measurements that take a long time or that benefit from a quiet environment, as opposed to the naturally noisy drilling environment. Various techniques that are sensitive to the mud flow, weight-on-bit, or motion of the drill string may be used alone or in combination to identify the drilling mode and control the data acquisition sequence.

59 Claims, 2 Drawing Sheets

APPARATUS AND METHOD FOR DETERMINING A DRILLING MODE TO OPTIMIZE FORMATION EVALUATION MEASUREMENTS

BACKGROUND OF THE INVENTION

The present invention relates generally to an apparatus and method for measuring properties of an earth formation traversed by a borehole, and more particularly, to an apparatus and method for determining a drilling mode to optimize formation evaluation measurements.

To make downhole measurements while a borehole is being drilled, measurement-while-drilling (MWD) and/or logging-while-drilling (LWD) systems are generally known which measure various useful parameters and characteristics such as the formation resistivity and the natural gamma ray emissions from the formations. Signals which are representative of these measurements made downhole are relayed to the surface with a mud pulse telemetry device that controls the mud flow, encoding information in pressure pulses inside the drill string. The pulses travel upward through the mud to the surface where they are detected and decoded so that the downhole measurements are available for observation and interpretation at the surface substantially in real time. As an alternative, it has also been found useful to provide a downhole computer with sufficient memory for temporarily storing these measurements until such time that the drill string is removed from the borehole.

U.S. Pat. Nos. 5,130,950 issued to Orban et al., 5,241,273 issued to Martin Lüling, 5,017,778 issued to Peter D. Wraight, 5,148,407 issued to Haldorsen et al., 5,585,556 issued to Petersen et al., and 5,705,927 issued to Sezginer et al., describe MWD tools which employ nuclear magnetic resonance, sonic, seismic, nuclear, or electromagnetic measurements. The tools disclosed in the prior art have disadvantages which limit their utility in MWD and/or LWD applications. Sonic, resistivity, nuclear, electromagnetic, and seismic measurements are directly influenced by the drilling noise. For example, while acoustic energy generated at the surface is usually very large, the energy that must be detected at the drill bit can be very small due to geometrical spreading and attenuation of the acoustic waves in the subsurface formation. In many cases, the drilling noise is orders of magnitude larger than the acoustic wave energy propagating from the surface to the subsurface MWD detector. Also, MWD and LWD nuclear magnetic resonance measurements are directly influenced by the vertical and lateral motion of the tool. For example, due to the amount of time required to obtain $T_1$ and $T_2$ measurements, the formation properties may change during the measurement cycle. These aforementioned factors adversely affect MWD and/or LWD measurements.

In the presence of a noisy drilling environment, the prior art tools obtain nuclear magnetic resonance, sonic, electromagnetic, nuclear, and seismic measurements directly influenced by the vertical and lateral tool motion and the drilling noise. None of the MWD and/or LWD tools determine the drilling mode and accordingly modify the data acquisition sequence to optimize formation evaluation measurements.

SUMMARY OF THE INVENTION

The above disadvantages of the prior art are overcome by means of the subject invention for an apparatus and method for determining a drilling mode to optimize formation evaluation measurements. A drill string, which includes an MWD tool, an LWD tool, or a plurality of tools, drills a borehole into the formation. Standard rotary drilling operations contain many natural pauses where the tool remains stationary: connection time as a new section of drill pipe is added to the drill string, circulation time when mud is circulated and the drill pipe is possibly rotated, and fishing or jarring time while the drill string is stuck and has to be freed before drilling can resume. These natural pauses, which occur without interrupting normal drilling operations, are utilized to make formation evaluation measurements of the subsurface formation that take a long time or that benefit from a quiet environment, such as nuclear magnetic resonance, seismic, sonic, nuclear, or electromagnetic measurements. A deliberate pause can be initiated, causing a portion of the drill string to remain stationary.

In order to utilize the pause interval to optimize formation evaluation measurements, the subject invention detects downhole conditions, determines the drilling process mode of operation, and modifies the data acquisition sequence. The detected downhole conditions include mud flow, acceleration of the drill string, bending of the drill string, weight-on-bit, and rotation of the drill string. The drilling process modes include drilling, sliding, tripping, circulating, fishing, a short trip (up or down), and drill pipe connections.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENTS

Figure 1:
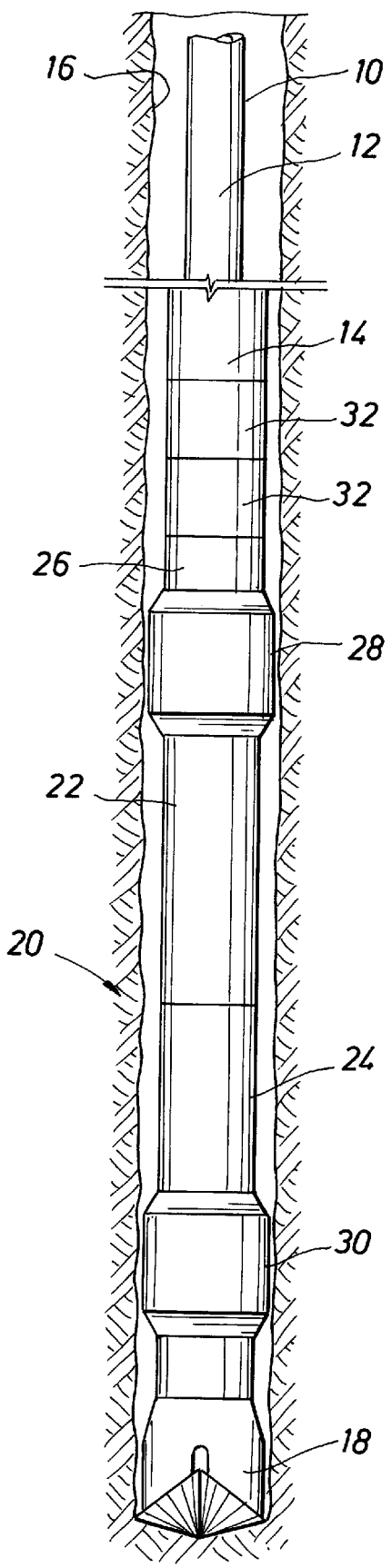
FIG. 1 depicts a preferred embodiment of an MWD tool string which uses drilling pauses to perform formation evaluation measurements of an earth formation; and, FIG. 2 graphically illustrates an application of the present invention for determining a drilling mode.

Referring to FIG. 1, a drill string 10, including lengths of drill pipe 12 and drill collars 14, is disposed in a borehole 16. A drill bit 18 at the lower end of the drill string 10 is rotated by the output shaft of a motor assembly 20 powered by drilling fluid or mud circulated down through a channel of the drill string 10. The drilling fluid exits the drill string 10 via jets in the drill bit 18 and then circulates upward in the region between the outside of the drill string 10 and the periphery of the borehole 16. The motor assembly 20 includes a power section 22 (rotor/stator or turbine) and a bent subassembly 24 that establishes a small bend angle, typically 0.5–2 degrees. As is known in the art, when the bit 18 is driven by the mud motor 20 only (with the drill string not rotating), the bit 18 will deviate in a direction determined by the tool face direction in which the drill string 10 is oriented [hereinafter, "sliding"]. When it is desired to drill substantially straight, the drill string 10 and the mud motor 20 are both rotated at appropriate rates.

A tool 32 designed for formation evaluation while drilling (LWD), drill string characterization while drilling (MWD), or a combination of both (LWD/MWD) is connected to the drill string 10. It is within contemplation of the subject invention to have a plurality of tools 32 connected to the drill string 10. An LWD tool or a tool combining both LWD and MWD characteristics operates to measure nuclear magnetic resonance, seismic, sonic, electromagnetic, or nuclear properties of the subsurface formation. Typical tools with this capability are disclosed, for example, in U. S. Pat. Nos. 5,055,787, 5,017,778, 5,448,227, 5,280,243, and 5,148,407. The foregoing formation evaluation while drilling technology is generally known to those skilled in the art.

A typical MWD tool 32 may measure such downhole conditions as the weight-on-bit, torque acting on the bit, the inclination and azimuthal direction of the borehole, mud resistivity, borehole pressure and temperature, as well as various other characteristics of the subsurface formation penetrated by the drill bit. The MWD tool 32 operates to telemeter information to the surface substantially in real time. Drilling mud pumped down through the drill string 10 passes through a device that modulates the mud flow to produce a stream of pressure pulses that are detected by a transducer at the surface. The operation of the valve is modulated by a controller in response to electrical signals from a cartridge that receives measurement data from sensors within the tool 32. Thus, the pressure pulses detected at the surface during a certain time period are directly related to particular measurements made downhole. The foregoing mud pulse telemetry technology is generally known to those skilled in the art. Other types of mud pulse telemetry systems, such as those that produce positive pulses, negative pulses, or combination of positive and negative pulses also may be used with the subject invention.

A sensor subassembly 26, which houses items such as sensors, circuit boards, batteries, and various other similar items, is included in the drill string 10. The sensor sub 26 includes magnetometers and/or accelerometers to detect rotational, lateral, and axial motion of the drill string 10. The sensor sub 26 may be connected to tool 32 or made an integral part thereof. An upper stabilizer 28 is positioned to substantially center the tool string in the borehole at this point. A lower stabilizer 30 is positioned to stabilize the rotation of the motor output shaft and the bit 18.

Standard rotary drilling operations contain many natural pauses where tool 32 remains stationary: connection time as a new section of drill pipe 12 is added to the drill string 10, circulation time when mud is circulated and the drill pipe 12 may or may not be rotated, and fishing or jarring time while the drill string 10 is stuck and has to be freed before drilling can resume. In accordance with the subject invention, these natural pauses, which occur without interrupting normal drilling operations, are utilized to make formation evaluation measurements, using tool 32 or a plurality of tools 32, that take a long time or that benefit from a quiet environment such as nuclear magnetic resonance, seismic, sonic, nuclear, or electromagnetic measurements. Alternatively, rather than waiting for a natural pause during the drilling operation, a deliberate pause can be initiated, causing a portion of the drill string to remain stationary.

An improved formation evaluation measurement is realized during the pause interval since noise and vibration caused by the drilling operation are eliminated and the tool 32 remains stationary with respect to the formation so that formation properties are not changing during the measurement cycle. The regular spacing between drill pipe connections enables quality control and calibration operations to be performed at regular depth intervals. In order to utilize the pause interval to optimize formation evaluation measurements, it is necessary to detect downhole conditions, determine the mode of operation which includes, but is not limited to, drilling, sliding, tripping, circulating, connections, short trips, and fishing, and modify the data acquisition sequence to make stationary measurements during the pause interval. Items included within the drill string 10, such as sensors, circuit boards, batteries, and magnetometers and/or accelerometers, are used to determine the drilling mode. These items may be within tool 32 or sensor subassembly 26. However, these items may be located anywhere within the drill string 10.

In the sensor sub 26 or tool 32, a circuit board containing digital logic uses the downhole condition measurements singly or in various combinations to determine automatically the drilling process mode:

TABLE 1

| Drilling Process Mode | Flow | Acceleration | | Weight-On-Bit | Rotation | Bending |
| --- | --- | --- | --- | --- | --- | --- |
| | | Axial | Transverse | | | |
| Drilling | Yes | Yes | Yes | Yes | Yes | Yes |
| Sliding | Yes | Yes | Yes | Yes | No | Yes |
| Tripping[1] | No | Yes | No | No | No | No |
| Circulating (pipe stationary) | Yes | No | No | No | N/A | No |
| Connections[1] | No | No | No | No | No | No |
| Short Trips[1] | No | Yes | No | No | No | No |
| Fishing | No | N/A | No | N/A | No | N/A |

In Table I, a "yes" indicates a drilling process mode detected by the captioned downhole condition, "no" indicates a drilling process mode undetected by the captioned downhole condition, and "N/A" indicates a drilling process mode inconclusively determined by the captioned downhole condition. Drilling process modes denoted with a superscript require further measurements and/or the history of the flow, acceleration, weight-on-bit, rotation, or bending measurements to distinguish between these modes.

Figure 2:
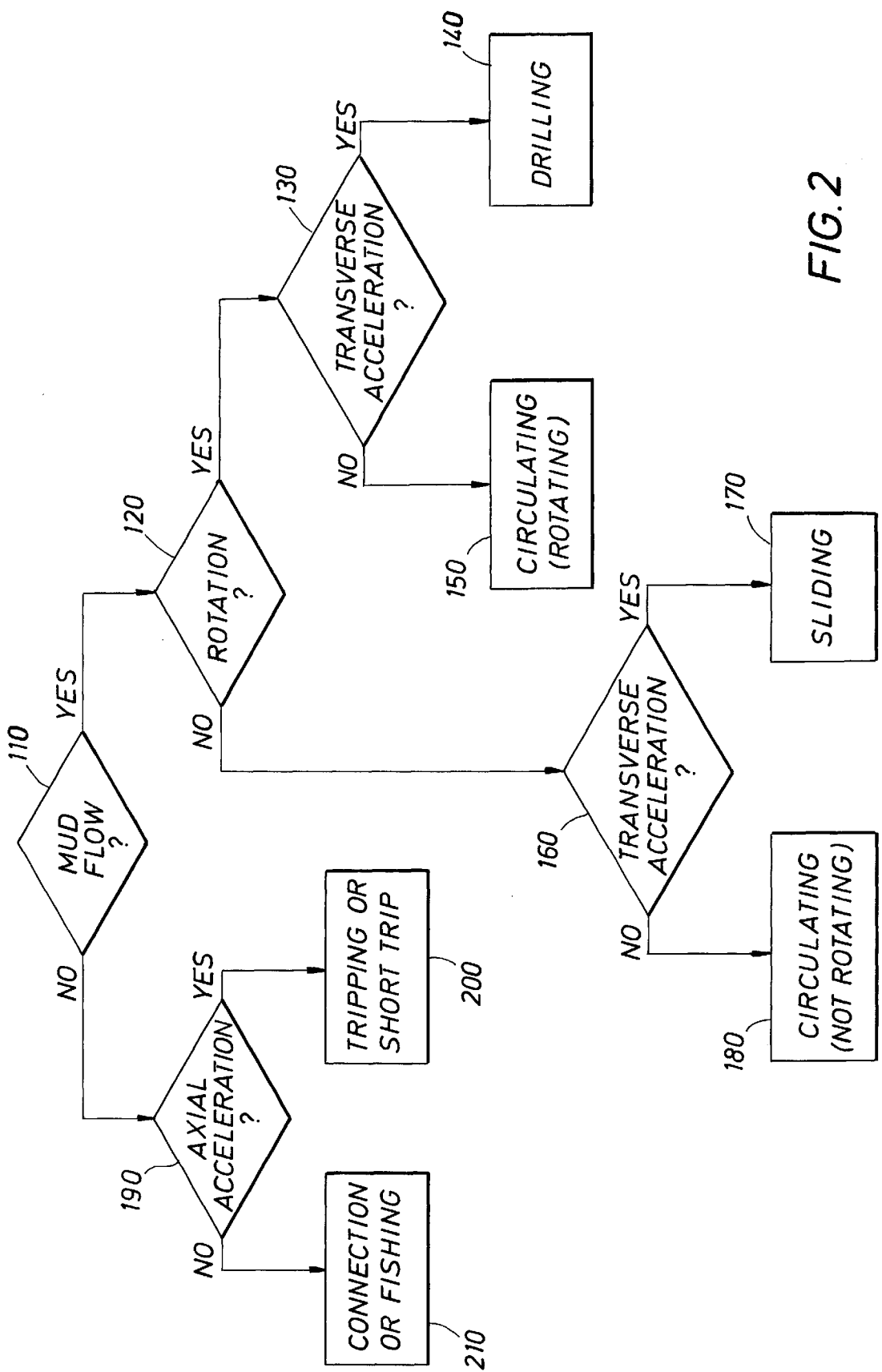

FIG. 2 graphically illustrates a representative flow chart for determining a drilling mode. Tool 32 detects downhole conditions, for example mud flow, acceleration (axial and transverse), motion (rotation and lateral), weight-on-bit, and bending. One skilled in the art recognizes that the method of the subject invention determines the drilling mode given one or a plurality of downhole condition measurements. The flow chart will vary based upon the number and type of downhole condition measurements that are factored into determining the drilling mode.

By way of example, the flow chart of FIG. 2 reflects a method for determining the drilling mode given the following downhole condition measurements: mud flow, rotation, and acceleration. At step 110, a detection item senses mud flow. A circuit board connected to the intertool power and communications bus may be used to detect power-down or data traffic on the bus thereby signaling a pause caused by a mode of operation where a portion of the drill string remains stationary, i.e., drill pipe connections, short trips (up or down), tripping, or a fishing operation. Pressure sensors for probing the mud flow or the mud motor shaft rotation may be used to detect a mode of continuous operation, i.e., drilling, sliding, or mud flow circulation.

If mud flow is detected, a detection item senses rotational motion of the drill string 10 (step 120). The tool face direction is measured by magnetometers and/or accelerometers in the sensor sub 26 or MWD tool 32. In the presence of mud flow, the presence of rotational motion indicates a mode of continuous operation, i.e., drilling or mud flow circulation. On the other hand, in the presence of mud flow, the absence of rotational motion is attributed to sliding or mud flow circulation. Detecting rotational motion of the drill string does not conclusively determine some modes of operation, such as mud flow circulation, where the drill pipe remains stationary.

If rotational motion is detected, an accelerometer senses transverse acceleration of the drill string motion of the drill string 10 (step 130). In the presence of transverse acceleration, the mode of operation is determined to be drilling (step 140). In the absence of transverse acceleration, the mode of operation is determined to be mud flow circulation (step 150).

If rotational motion is not detected at step 120, an accelerometer senses transverse acceleration of the drill string motion of the drill string 10 (step 160). In the presence of transverse acceleration, the mode of operation is determined to be sliding (step 170). In the absence of transverse acceleration, the mode of operation is determined to be mud flow circulation (step 180).

If mud flow is not detected at step 110, a detection item, such as an accelerometer, senses axial acceleration of the drill string 10 (step 190). Even when the mud flow is stopped, under certain conditions, the drill pipe undergoes axial movement, e.g., pulling out the kelly at the upper end of the drill string. In the absence of mud flow, the presence of axial acceleration at step 200 indicates a mode of continuous operation, i.e., tripping or short trips (up or down). On the other hand, in the absence of mud flow, the absence of axial acceleration at step 210 is attributed to a drill pipe connection or fishing mode of operation. Further measurements and/or a history of the flow, acceleration, and rotation measurements are necessary to further distinguish the modes of operation identified at steps 200 and 210.

In the present invention, a detection item, such as strain gauges in the drill collar, senses weight-on-bit, bending, or torsion. The gauges may signal either a continuous operation, i.e., drilling or sliding, or a pause interval caused by drill pipe connections, mud flow circulation, short tips (up or down), or tripping (step 210 or 240). Detecting weight-on-bit, torsion, or bending does not conclusively determine some modes of operation, such as a fishing operation where the drill pipe remains stationary.

After automatically determining a drilling mode, for example a pause during the drilling operation, tool 32 provides nuclear magnetic resonance, seismic, sonic, nuclear, or electromagnetic measurements utilizing an acquisition mode suitable for the detected drilling mode. There are a number of useful formation measurements that can be made during a pause interval. If tool 32 provides NMR measurements, the pause interval can be utilized for optimizing the NMR measurement of the tool. Preferably, the pause interval is used for tuning the tool 32. The $B_0$ field might change in an unpredictable manner due to the collection of magnetic debris on the tool 32 or more predictably due to changes in the temperature. Tuning the tool 32 is easier when the tool is stationary and is accomplished differently depending on whether a saddle point or a gradient geometry is used.

For a saddle point geometry, the NMR signal has a maximum for $\omega_0 = \gamma B_0$ at the saddle point. By sweeping through frequencies in search of the Larmor frequency, the same geometry and volume is ensured for the sensitive region. For a gradient tool, no Larmor frequency search is necessary or possible. The measurement is always made at the resonance frequency and the lengthy search for the Larmor frequency is avoided. The disadvantage to the gradient measurement is that a correction may be necessary if the volume of the sensitive region changes as $B_0$ changes.

One possibility to solve this problem in a gradient tool consists of the following steps:

1. Optimizing the pulse duration for a given frequency $\omega_0$ by varying the 90° and/or 180° pulse durations, $t_{90}$ and $t_{180}$ respectively, to obtain the maximum signal. For the 180° pulse, for example, $$\pi = \int_0^{t_{180}} \gamma B_1 f(t) dt = \gamma B_1 \int_0^{t_{180}} f(t) dt \approx t_{180} \gamma B_1 F,$$

are known. This provides $B_1$ in the sensitive volume.

2. Determine the quality factor Q of the antenna either by using a small injection loop which induces a signal in the antenna and determining the overall gain of the receiver path, correcting for the known gain of the receiver electronics, or by measuring the strength of the signal of the antenna in a small pickup loop.

3. Since $B_1 \alpha QI\phi(r)$ where $\phi(r)$ describes the known radial dependence of the $B_1$ field, one can find $\phi(r)$ and invert it to obtain the effective radius and hence the volume of the sensitive region.

As another example, the pause interval can be utilized to provide $T_2$ measurements with an NMR tool 32. The noisy drilling environment, and particularly the lateral motion of the drill pipe, makes NMR measurements difficult. NMR measurements are inherently slow and may consist of a rather long sequence of pulses and echoes. With the subject invention, the pause interval during the drilling operation provides an excellent opportunity to acquire formation data.

One appropriate measurement during the pause interval is hydrocarbon typing, where a measurement is made that responds to the bulk hydrocarbon properties. This can often involve $T_1$ and $T_2$ on the order of a few seconds, and the measurement time is very long, approximately several tens of seconds or more. The following examples of $T_1$ and $T_2$ measurements with NMR devices is given in R. Akkurt, H. J. Vinegar, P. N. Tutunjian, and A. J. Guillory, *NMR Logging of Natural Gas Reservoirs,* THE LOG ANALYST (November–December 1996).

TABLE 2

|  | $T_1$ (msec) | $T_2$ (msec) | HI | Dox10$^{-5}$ (cm$^2$/s) |
|---|---|---|---|---|
| Oil | 5000 | 460 | 1 | 7.9 |
| Gas | 4400 | 40 | .38 | 100 |

TABLE 3

| Wait Time (sec) | Echo (msec) | spacing Echoes | Acquisition time (sec) |
|---|---|---|---|
| 1.5 | 1.2 | 1200 | 5.88 |
| 8 | 1.2 | 1200 | 18.88 |

In Table 2, the $T_2$ properties are based on a high gradient (17 Gauss/cm) wireline device with the inter-echo time, $T_E$, approximately equal to 1.2 milliseconds. The reference does not include the total acquisition time or number of echoes. In Table 3, a total number of 1200 echoes is assumed which corresponds to 1.44 seconds and represents approximately 3*$T_2$(oil) worth of data.

TABLE 4

|     | $T_1$ (msec) | $T_2$ (msec) | HI | $D$o x$10^{-5}$ (cm$^2$/s) |
| --- | --- | --- | --- | --- |
| Oil | 5000 | 1450 | 1 | 7.9 |
| Gas | 4400 | 156 | .38 | 100 |

TABLE 5

| Wait Time (sec) | Echo spacing (msec) | Echoes | Acquisition time (sec) |
| --- | --- | --- | --- |
| 1.5 | 6 | 750 | 12 |
| 8 | 6 | 750 | 25 |

In Table 4, the $T_2$ properties are based on a low gradient (1.7 Gauss/cm) logging tool with the inter-echo time, $T_E$, approximately equal to 6 milliseconds. The inter-echo time is increased to provide a good separation between oil and gas. For a gradient of 1.7 Gauss/cm, a separation of about 1 decade is obtained. Due to reduced diffusion, the $T_2$ properties are different for a low gradient tool. Referring to Table 5, a total number of 750 echoes corresponds to about 4.5 seconds and represents approximately $3*T_2$(oil) worth of data. Since signal-to-noise varies as a function of the square root of the total number of measurements averaged together, it may be desirable to repeat these measurements several times and stack the results. For either a high gradient or low gradient NMR device, the drilling environment is possibly too noisy to make a long $T_2$ measurement. A pause interval triggering event such as drill pipe connections, a fishing operation, or mud circulation affords the opportunity to obtain an improved $T_2$ measurement because noise and vibration caused by the drilling operation are absent during the pause interval.

As another example, the pause interval can be utilized to provide $T_1$ measurements with an NMR tool 32. $T_1$ is generally controlled by surface relaxation mechanisms and not affected by diffusion. Therefore, the knowledge of the $T_1$ distribution of the formation is desirable and may be easier to interpret than the corresponding $T_2$ spectrum. The two $T_2$ measurements with varying wait times discussed with reference to Table 2 and Table 4 can be inverted to provide an indication of the $T_1$ of the formation. These measurements could either be made sequentially using a single NMR experiment, e.g., multi-wait station logging, or could be made simultaneously on two different volumes of the formation. In either case, the long measurement times and need for high signal-to-noise suggests the need for a stationary measurement.

Another $T_1$ measurement technique is inversion recovery. Inversion recovery requires a time consuming series of experiments. In each experiment, the equilibrium magnetization is inverted by a 180° pulse. After a varying recovery time, the magnetization is read out by a 90° pulse, which rotates the partially recovered magnetization into the transversal plane and produces a measurable signal. Since between these experiments the magnetization needs to be relaxed and a wait time long in comparison to $T_1$ needs to be introduced, these measurements are very time consuming and usually only performed in laboratory experiments. For example, a series of 30 experiments with a wait time of five seconds between each experiment requires at least 150 seconds. A pause interval triggering event such as drill pipe connections, a fishing operation, or mud circulation affords the opportunity to obtain an improved $T_1$ measurement because the tool remains stationary during the pause interval.

If tool 32 provides acoustic measurements, the pause interval can be utilized to obtain a vertical seismic profiling while drilling measurement (VSPWD). The drilling process generates a wide spectrum of acoustic noise as the drill bit destroys the rock to create a borehole. The noise levels at seismic frequencies are high enough for detection by geophones or hydrophones, thousands of feet away, at the surface. Noise levels rapidly decrease at high frequencies but significant levels still exist in the sonic frequency band. While-drilling acoustic measurements are directly influenced by the drilling noise. This is particularly the case for the measurements that require recording of small arrivals or echoes. VSPWD is the technique where a powerful acoustic source, such as an air gun, is fired at the surface, and the travel time of seismic waves from the surface to the drill bit is measured by recording the seismic waves by a downhole acoustic receiver, such as a hydrophone or geophone. Although the acoustic energy generated at the surface is usually very large, the energy that must be detected at the bit can be very small due to geometrical spreading and attenuation of the acoustic waves in the subsurface. In many cases, the drill noise is expected to be orders of magnitude larger than this signal sent from the surface. Therefore, in these cases, the VSPWD type measurement is possible only when the drilling process is stopped.

Another acoustic measurement that requires recording of possibly very small levels of energy is the borehole sonar. In this measurement, an acoustic source located downhole on the bottom hole assembly sends sound waves into the formation. These waves reflect back from layer boundaries and echoes are recorded by an acoustic receiver also located on the bottom hole assembly. The strength of the echo depends on the distance of the reflector to the borehole, the reflectivity of the reflector, the strength of the source, and the attenuation properties of the medium. Since downhole sources have limited power, the strength of the reflections in many cases could be lower than the drilling noise levels, and the sonar echoes could only be detected when the drilling is stopped.

If tool 32 provides electromagnetic measurements, the pause interval can be utilized to obtain deep reading electromagnetic measurements. Potential applications range from traditional two megahertz resistivity measurements to lower frequency resistivity measurements to ground penetrating radar. These techniques require high power and result in fairly low signals. The subject invention provides three significant benefits. First, during drilling, a portion of the power from the downhole turbine and/or batteries is used to charge an electrical storage device such as a capacitor bank. During the pause interval, the stored energy is used to power the deep reading EM device or other devices, such as an acoustic transmitter. In this way, high power is provided without the need for deploying either a high power turbine or high power battery systems. Second, when the electromagnetic measurement is made, receivers placed at a relatively long spacing are used to make the deep measurement. The low signal level recorded at these receivers require the low noise environment found during drilling pauses. Third, near borehole electromagnetic processing techniques require fixed source to receiver positions. Making the measurements during pauses insures that the source to receiver position is fixed and well known.

The foregoing description of the preferred embodiment of the present invention has been presented for purposes of illustration and description. It is not intended to be exhaustive nor to limit the invention to the precise form disclosed. Obviously, many modifications and variations will be apparent to those skilled in the art. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What is claimed is:

1. A method for using drilling pauses to perform formation evaluation measurements of an earth formation surrounding a borehole, comprising the steps of:
   a) drilling the borehole into the formation using a drill string;
   b) while drilling the borehole, detecting a pause where a portion of the drill string remains stationary with respect to the formation for a time interval; and
   c) determining a characteristic of the formation during the time interval.

2. The method of claim 1 wherein step (b) further comprises the steps of detecting at least one current downhole condition; and, identifying a type of pause using at least one current downhole condition and a history of the previously detected downhole conditions.

3. The method of claim 1 wherein step (b) further comprises the steps of detecting at least one current downhole condition, identifying a current drilling process mode; and, identifying a type of pause using at least one current downhole condition and a history of the previously identified drilling process modes.

4. The method of claim 2 wherein the drill string further comprises a drill bit and the downhole condition comprises mud flow, acceleration of the drill string, bending of the drill string, weight-on-bit, or rotation of the drill string.

5. The method of claim 3 wherein the drill string further comprises a drill bit and the downhole condition comprises mud flow, acceleration of the drill string, bending of the drill string, weight-on-bit, or rotation of the drill string.

6. The method of claim 3 wherein the drilling process mode comprises drilling, sliding, tripping, circulating, fishing, a short trip, or a drill pipe connection.

7. The method of claim 1 wherein the formation characteristic is determined using a nuclear magnetic resonance tool.

8. The method of claim 7 further comprising the step of optimizing an NMR measurement obtained with the tool.

9. The method of claim 8 further comprising the step of tuning the tool during the time interval.

10. The method of claim 9 further comprising the steps of optimizing a pulse duration to obtain a maximum signal, determining a quality factor of an antenna, and, inverting a known radial dependence of B1 to obtain an effective radius and a volume of a region of investigation.

11. The method of claim 7 wherein the formation characteristic comprises the transverse relaxation time.

12. The method of claim 7 wherein the formation characteristic comprises the longitudinal relaxation time.

13. The method of claim 7 wherein the formation characteristic identifies the presence of hydrocarbons in the formation.

14. The method of claim 13 wherein the formation characteristic identifies the presence of oil in the formation.

15. The method of claim 13 wherein the formation characteristic identifies the presence of gas in the formation.

16. The method of claim 1 wherein the formation characteristic is determined using a seismic tool.

17. The method of claim 16 further comprising the step of transmitting seismic signals into the formation.

18. The method of claim 17 further comprising the steps of receiving the seismic signals from the formation and analyzing the received signals to determine the formation characteristic.

19. The method of claim 1 wherein the formation characteristic is determined using a sonic tool.

20. The method of claim 19 further comprising the step of transmitting acoustic signals into the formation.

21. The method of claim 20 further comprising the steps of receiving the acoustic signals from the formation and analyzing the received signals to determine the formation characteristic.

22. The method of claim 1 wherein the formation characteristic is determined using a resistivity tool.

23. The method of claim 22 further comprising the step of propagating electromagnetic energy into the formation.

24. The method of claim 23 further comprising the steps of receiving electromagnetic energy that has propagated through the formations and analyzing the received signals to determine the formation characteristic.

25. The method of claim 1 wherein before step (b), the method further comprises the step of triggering an event which interrupts the drilling process.

26. The method of claim 1 wherein the formation characteristic is determined using a nuclear tool.

27. The method of claim 26 wherein the formation characteristic identifies gamma ray density.

28. The method of claim 26 wherein the formation characteristic identifies neutron porosity.

29. The method of claim 26 wherein the formation characteristic identifies pulsed neutron porosity.

30. The method of claim 26 further comprising the step of obtaining a pulsed neutron spectroscopic measurement.

31. An apparatus for performing formation evaluation measurements of an earth formation surrounding a borehole, comprising:
   a) a drill string;
   b) drilling means attached to the drill string for drilling the borehole into the formation;
   c) means for rotating the drilling means;
   d) means for rotating the drill string; and,
   e) means for detecting a pause where a portion of the drill string remains stationary with respect to the formation for a time interval and,
   f) means for determining a characteristic of the formation during the time interval.

32. The apparatus of claim 31 wherein the formation characteristic is determined using a nuclear magnetic resonance tool.

33. The apparatus of claim 32 further comprising means for optimizing an NMR measurement obtained with the tool.

34. The apparatus of claim 33 wherein the optimizing means further comprises means for tuning the tool during the time interval.

35. The apparatus of claim 34 wherein the means for tuning the tool further comprises means for optimizing a pulse duration to obtain a maximum signal, means for determining a quality factor of an antenna, and, means for inverting a known radial dependence of B1 to obtain an effective radius and a volume of a region of investigation.

36. The apparatus of claim 32 wherein the formation characteristic comprises the transverse relaxation time.

37. The apparatus of claim 32 wherein the formation characteristic comprises the longitudinal relaxation time.

38. The apparatus of claim 32 wherein the formation characteristic identifies the presence of hydrocarbons in the formation.

39. The apparatus of claim 38 wherein the formation characteristic identifies the presence of oil in the formation.

40. The apparatus of claim 38 wherein the formation characteristic identifies the presence of gas in the formation.

41. The apparatus of claim 31 wherein the formation characteristic is determined using a seismic tool.

42. The apparatus of claim 41 further comprising means for transmitting seismic signals into the formation.

43. The apparatus of claim 42 further comprising means for receiving the seismic signals from the formation and analyzing the received signals to determine the formation characteristic.

44. The apparatus of claim 31 wherein the formation characteristic is determined using a sonic tool.

45. The apparatus of claim 44 further comprising means for transmitting acoustic signals into the formation.

46. The apparatus of claim 45 further comprising means for receiving the acoustic signals from the formation and analyzing the received signals to determine the formation characteristic.

47. The apparatus of claim 31 wherein the formation characteristic is determined using a resistivity tool.

48. The apparatus of claim 47 further comprising means for propagating electromagnetic energy into the formation.

49. The apparatus of claim 48 further comprising means for receiving electromagnetic energy that has propagated through the formations and analyzing the received signals to determine the formation characteristic.

50. The apparatus of claim 31 wherein the formation characteristic is determined using a nuclear tool.

51. The apparatus of claim 50 wherein the formation characteristic identifies gamma ray density.

52. The apparatus of claim 50 wherein the formation characteristic identifies neutron porosity.

53. The apparatus of claim 50 wherein the formation characteristic identifies pulsed neutron porosity.

54. The apparatus of claim 50 further comprising a means for obtaining a pulsed neutron spectroscopic measurement.

55. A method for modifying a data acquisition sequence, comprising the steps of:
   a) drilling a borehole into an earth formation using a drill string;
   b) while drilling the borehole, detecting a current downhole condition;
   c) identifying a current drilling process mode;
   d) selecting a data acquisition sequence based upon the current drilling process mode; and
   e) modifying a current data acquisition sequence based upon the selected data acquisition sequence.

56. The method of claim 55 wherein a plurality of current downhole conditions and a history of the previously detected downhole conditions are used to identify the current drilling process mode.

57. The method of claim 55 wherein a plurality of current downhole conditions and a history of the previously identified drilling process modes are used to identify the current drilling process mode.

58. The method of claim 55 wherein the drill string further comprises a drill bit and the downhole condition comprises mud flow, acceleration of the drill string, bending of the drill string, weight-on-bit, or rotation of the drill string.

59. The method of claim 55 wherein the drilling process mode comprises drilling, sliding, tripping, circulating, fishing, a short trip, or a drill pipe connection.

* * * * *